United States Patent [19]
Gotoh et al.

[11] Patent Number: 6,004,611
[45] Date of Patent: Dec. 21, 1999

[54] GENERAL-PURPOSE OILS COMPOSITION

[75] Inventors: Naohiro Gotoh; Hiroyuki Watanabe; Tsutomu Nishide; Takuji Yasukawa, all of Ibaraki, Japan

[73] Assignee: Kao Corporation, Tokyo, Japan

[21] Appl. No.: 08/942,478

[22] Filed: Oct. 2, 1997

[30]     Foreign Application Priority Data

Oct. 18, 1996   [JP]   Japan ..................................... 8-276072

[51] Int. Cl.$^6$ .............................. A23D 7/00; A23C 7/00; C07C 53/00; C07C 51/00
[52] U.S. Cl. .......................... 426/612; 426/610; 426/611; 554/227; 554/169
[58] Field of Search ..................................... 426/611, 610, 426/612; 554/169, 227

[56]               References Cited
              U.S. PATENT DOCUMENTS 4,976,984  12/1990  Yasukawa et al. ..................... 426/602
5,514,405   5/1996  Yokomichi et al. .................... 426/604

FOREIGN PATENT DOCUMENTS 0 307 154   3/1989   European Pat. Off. .
0 679 712  11/1995   European Pat. Off. .
 8-26988    1/1996   Japan .
WO 96/32022 10/1996  WIPO .

*Primary Examiner*—Paul J. Killos
*Assistant Examiner*—J. Parsa
*Attorney, Agent, or Firm*—Oblon, Spivak, McClelland, Maier & Neustadt, P.C.

[57]                ABSTRACT

The present invention provides a general-purpose edible oils composition which can prevent an increase of the blood triglyceride level of a person having eaten, is little accumulated in the body, and is excellent in storage stability and flavor. A general-purpose liquid oils composition which comprises oils containing 1,3-diglycerides in an amount of 40% by weight or above and monoglycerides in an amount of less than 1.5% by weight, with unsaturated fatty acids accounting for at least 93% by weight of the fatty acid components constituting the diglycerides.

10 Claims, No Drawings

GENERAL-PURPOSE OILS COMPOSITION

BACKGROUND OF THE INVENTION

1. Field of the Invention

The present invention relates to an edible oils composition which can prevent an increase of the triglycerides in the blood of a person having eaten, as compared with conventional edible oils, is little accumulated in the body, is excellent in storage stability and flavor, and exhibits general-purpose properties (of being liquid even at low temperatures and being usable as a substitute for conventional cooking oils).

2. Description of Related Art

A human being takes the necessary calories mainly from sugars and lipids. However, the current tendency toward unbalanced intake of nourishment and/or intake of excess calories promotes obesity and is causative of degenerative diseases or other problems. In particular, the lipidic intake has recently increased in the dietary habits of advanced nations, which brings about an increase in blood triglyceride level and obesity and presents an important cause of degenerative diseases. Since the blood triglyceride level and blood cholesterol level have a close relation with arteriosclerosis, it is particularly essential to the prevention of degenerative diseases to keep these levels low, and education is therefore made in advanced nations for the purpose of keeping the levels low. In fact, however, the number of deaths from circulatory degenerative diseases is steadily increasing.

In general, a food prepared by using much lipids (such as fats and oils) is good and a man of the present age becomes used to such a food, which is a reason for the above problematic tendency. The tendency is found even among Japanese peoples who took a little lipid, and the rate of the lipidic intake to the total energetic intake has increased three-fold in the last 50 years. Under these circumstances, several low-calories substitutes for fats and oils were developed by making the properties of a protein or sugar approach those of fats and oils, and proposed for the purpose of reducing the lipidic intake. However, these substitutes could not satisfactorily be substituted for fats and oils in respects of flavor, palatability and physical properties. Further, the substitutes failed in fulfilling another role of fats and oils, i.e., the role as a heating medium in cooking. It is therefore considered that if fats and oils which exhibit flavor, palatability and physical properties equivalent to those of currently used fats and oils can be used as a heating medium and can inhibit the postprandial increase in blood triglyceride level is developed, it will become possible to inhibit obesity to thereby lower the morbidity rate of degenerative diseases.

Unabsorbable fats and oils have recently been developed extensively as described below. For example, there have been proposed sucrose-fatty acid polyesters (Mattson et al., U.S. Pat. No. 3,600,186). These polyesters are not absorbed into the body, but are excreted, so that these oils provide no calorie. However, liquid sucrose-fatty acid polyesters pose problems of causing anal leakage, hindering the absorption of fat-soluble vitamins, and so on, because they are unabsorbable fats and oils. The use was authorized by FDA on Jan. 30, 1996, under the restriction that semi-solid or solid sucrose polyesters having a melting point of 37.8 to 71.1° C. and containing vitamins A, D, E and K in predetermined amounts respectively are applied only to salty snack foods. The restriction was made for the purposes of protecting the absorption of fat-soluble vitamins from the above hindrance and inhibiting anal leakage. This fact means that the substitutes for fats and oils are not satisfactory in general-purpose properties.

It has been known to the public that a medium-chain fatty acid triglyceride (MCT) does not accumulate in the body. However, MCT exhibits a problematic smoke point of as low as 160° C. or below in cooking, so that the use of MCT as a cooking oils is unsuitable.

Further, there have been proposed triglycerides having both a long-chain saturated fatty acid (such as behenic acid) and a medium-chain fatty acid having ten or fewer carbon atoms (Seiden: JP-A 2-1799) and triglycerides having both a long-chain saturated fatty acid (such as stearic acid) and a short-chain fatty acid (Chrysam: JP-A 6-506106). It is expected that these triglycerides prevent an increase of the blood triglyceride level of a person having eaten, and therefore can be used favorably as fats and oils substitutes preventing degenerative diseases, because they contain long-chain saturated fatty acids which are little absorbed into the body and medium- or short-chain fatty acids which are not accumulated in the body. However, the glycerides are solid and therefore are poor in the general-purpose properties.

An edible oils and fats composition is disclosed in U.S. Pat. No. 4,976,984, which comprises phospholipids and glyceride mixtures containing diglycerides in an amount of 5 to 100%. Further, a serum triglyceride level lowering agent and a weight-increase inhibitor containing a diglyceride as the active ingredient are disclosed in JP-A 4-300 825 and JP-A 4-300 826.

Further, a fats and oils composition is disclosed in JP-A 8-60180, which comprises afats and oils component, containing a diglyceride consisting of a long-chain fatty acid and a short-chain fatty acid, as a constituent fatty acid.

DISCLOSURE OF THE INVENTION

SUMMARY OF THE INVENTION

The present invention aims at providing an edible oils composition which has general-purpose properties (of being liquid even at low temperatures and being substitutable for conventional cooking oils) equivalent to those of conventional oils, inhibits the increase of blood triglyceride which is one of the causes of arteriosclerosis, is little accumulated in the body, and is excellent in storage stability and flavor.

The inventors of the present invention have extensively studied to solve the above problems, and have found that an oils composition which comprises oils containing 1,3-diglycerides in an amount of at least 40% by weight, preferably at least 45% by weight, still preferably at least 50% by weight, and monoglycerides in an amount of less than 1.5% by weight, preferably less than 1% by weight, with unsaturated fatty acids accounting for at least 93% by weight, preferably at least 95% by weight of the fatty acid components constituting the diglycerides, is prevented an increase of the blood triglycerides of a person having eaten, as compared with conventional edible oils, is little accumulated as body and visceral fats, and can be applied to all of the fields which conventional edible oils are applied to. The present invention has been accomplished on the basis of this finding.

DETAILED DESCRIPTION OF THE INVENTION

The present invention will now be described in detail.

Unlike triglycerides (which constitute ordinary oils), 1,3-diglycerides are hydrolyzed in the duodenum to give mainly 1-monoglycerides (while triglycerides give mainly 2-monoglycerides). As a result of this phenomenon, the resynthesis of triglycerides in the epithelial cells of the small intestine is inhibited to thereby lower the blood triglyceride level in the lymph duct, which leads to the effect of reducing the accumulation of body and visceral fats. 1,2-Diglycerides give mainly 2-monoglycerides when hydrolyzed in the duodenum, and therefore fail in exhibiting such an effect. Thus, it is essential to the attainment of effects of "inhibiting the increase of the blood triglyceride and "reducing the accumulation of body and visceral fats" that the oils contain at least 40% by weight of 1,3-diglycerides.

Since the oils composition of the present invention is a liquid general-purpose one, it is expected to be usable as general-purpose edible oils (such as cooking oils). From the standpoint of such use, it is desirable that the composition has a smoke point of the conventional cooking temperature (170° C.) or above, more desirably 180° C. or above, most desirably 190° C. or above. Further, it is desirable in respect of flavor that the composition has a monoglyceride content of less than 1.5% by weight, desirably less than 1% by weight, and an acid value (AV) of 1.0 or below.

Further, it is preferable from the standpoint of oxidation resistance in both storage and cooking to add an antioxidant in an amount of 50 to 2000 ppm, particularly 400 to 1000 ppm based on the oils. The antioxidant is preferably one or more members selected from among natural antioxidants, tocopherols, ascorbyl palmitate, ascorbyl stearate, BHT, BHA, phospholipids and so on. It is particularly preferable to use one or more antioxidants selected from among natural antioxidants, tocopherols, ascorbyl palmitate and phospholipids. It is most preferable to use ascorbyl palmitate and tocopherols together.

Since the oils composition of the present invention is used mainly as a general-purpose edible oils (such as cooking oils), it is unfavorable that the composition causes crystallization or solidification during storage. In order to inhibit such unfavorable crystallization or solidification even during the storage in a refrigerator, it is desirable that the content of 1,3-diglycerides in the oils is 90% by weight or below, more desirably 80% by weight or below, most desirably 75% by weight or below, and it is essential that unsaturated fatty acids accounts for at least 93% by weight, preferably at least 95% by weight of the fatty acid components constituting the diglycerides.

The number of carbon atoms of the fatty acid components constituting the diglycerides is 12 to 24, preferably 16 to 22.

Further, it is desirable that the monounsaturated fatty acids such as oleic acid content of the unsaturated fatty acids is 60% by weight or below, preferably 50% by weight or below. The residue are the polyunsaturated fatty acids such as linolic acid and linolenic acid.

More specifically, it is preferable that the oils composition be one wherein unsaturated fatty acids account for at least 93% by weight of the fatty acid components constituting the diglycerides and the monounsaturated fatty acids content of the unsaturated fatty acids is 60% by weight or below.

Further, it is still preferable that the oils composition be one wherein unsaturated fatty acids account for at least 95% by weight of the fatty acid components constituting the diglycerides and the oleic acid content of the unsaturated fatty acids is 50% by weight or below.

The oils composition can be produced by using, as the raw material, fatty acids prepared by removing saturated fatty acids by wintering from the fatty acids obtained by the hydrolysis of rapeseed oil or soybean oil.

Further, it is also preferable to add a crystallization inhibitor having an HLB value of 4 or below, preferably 3 or below in an amount of 200 to 5000 ppm, particularly 500 to 2000 ppm based on the oils for the purpose of improving the stability at low temperatures, while the HLB value of each compound was determined by the empirical formula fit for the compound (for example, Griffin's empirical formula was used for polyglycerol-fatty acid esters.). Examples of the crystallization inhibitor include polyglycerol-fatty acid esters, sucrose-fatty acid esters and sorbitan-fatty acid esters.

EXAMPLES

The effects of the present invention will be described in more detail by referring to the following Examples, though the present invention is not limited by the Examples. In the Examples, all percentages are by weight unless otherwise noted.

Preparation of Oils

Fatty acids of rapeseed oil or soybean oil (or a fatty acid prepared by removing saturated fatty acids from the fatty acids of soybean oil by wintering) was reacted with glycerol at 40° C. in the presence of a commercially available immobilized 1,3-regioselective lipase preparation (trade name: "Lipozyme 3A", a product of Novo Industry A.S.), followed by the removal of the lipase preparation by filtration. The resulting reaction mixture was subjected to molecular distillation and purified in a conventional manner to give a liquid oil A. Further, liquid oils B, C, F, G, I and J were prepared in a similar manner to that described above with the reaction times controlled.

Further, liquid oils D and E were prepared in a similar manner to that described above except for the use of a fatty acid mixture prepared by adding a suitable amount of a saturated fatty acid (palmitic acid and/or stearic acid) to fatty acids originating in rapeseed oil.

Additionally, a liquid oil H was prepared by subjecting a similarly prepared oils to column chromatography (with a product of Wako Pure Chemical Industries, Ltd., Wako gel C-200, and hexane/ether (70:30)) to recover a triglyceride fraction and a diglyceride fraction with the removal of fatty acid and monoglyceride fractions, and removing the solvent from the recovered fractions.

The glyceride composition of each oil and the constituent fatty acids of the diglycerides were determined as follows.

Determination of Distribution of Glyceride Composition

Each oil was reacted with a silylating agent (a product of Kanto Chemical Co., Ltd., a silylating agent TH) and the resulting silylated oils were analyzed by use of a gas chromatograph equipped with a capillary column (such as DBTM-1, a product of J&W) and a hydrogen flame ionization detector. The glyceride composition and the 1,3-diglyceride content were determined based on the retention times and the peak area ratios.

Determination of Constituent Fatty Acids of Diglyceride

A diglyceride fraction was collected from each oil by subjecting the oils to column chromatography (with a product of Wako Pure Chemical Industries, Ltd., Wako gel C-200), eluting triglycerides from the column with hexane, and passing hexane/ether (70:30) through the resulting column, and thereafter analyzed by gas chromatography according to the method described in "2.4.20.2-77 Preparation of methyl esters of fatty acids" and "2.4.21.2-73 Fatty acid composition" of "Standard Analytical Methods for Fats and Oils" (edited by the Japan Oil Chemists' Society). The composition of the fatty acid components constituting the diglycerides were determined based on the retention times and peak area ratios found in the obtained chart.

The compositions of the oils to be used are given in Table 1, and those of conventional oils in Table 2.

TABLE 1

| Oils | Details | Glyceride compn. (%) MG | Glyceride compn. (%) 1,3-DG | Fatty acid compn. of diglyceride (%) satd. fatty acid | Fatty acid compn. of diglyceride (%) unsatd. fatty acid | Acid value (AV) |
|---|---|---|---|---|---|---|
| Liquid oil A | one prepared from rapeseed oil fatty acid and contg. 50% of 1,3-diglyceride | 1.4 | 53.5 | 3.0 | 97.0 | 0.3 |
| Liquid oil B | one prepared from rapeseed oil fatty acid and contg. 40% of 1,3-diglyceride | 1.2 | 41.3 | 5.1 | 94.9 | 0.2 |
| Liquid oil C | one prepared from rapeseed oil fatty acid and contg. 30% of 1,3-diglyceride | 0.9 | 33.7 | 7.0 | 93.0 | 0.2 |
| Liquid oil D | one wherein saturated fatty acid accounts for more than 10% of the fatty acid component constituting diglyceride | 1.3 | 51.9 | 12.1 | 87.9 | 0.5 |
| Liquid oil E | one wherein saturated fatty acid accounts for more than 10% of the fatty acid component constituting diglyceride | 1.0 | 46.4 | 19.7 | 80.3 | 0.3 |
| Liquid oil F | one prepared from rapeseed oil fatty acid and contg. 2.2% of monoglyceride | 2.2 | 46.8 | 5.6 | 94.4 | 2.6 |
| Liquid oil G | one prepared from rapeseed oil fatty acid and contg. 4.5% of monoglyceride | 4.5 | 53.2 | 6.1 | 93.9 | 3.0 |
| Liquid oil H | one prepared from rapeseed oil fatty acid and contg. 92% of 1,3-digylceride | 0.6 | 91.6 | 5.3 | 94.7 | 0.2 |
| Liquid oil I | one prepared from wintered soybean oil fatty acid and contg. 40% of 1,3-diglycende | 0.5 | 40.7 | 3.5 | 96.5 | 0.1 |
| Liquid oil J | one prepared from wintered soybean oil fatty acid and contg. 50% of 1,3-diglyceride | 0.5 | 51.3 | 4.8 | 95.2 | 0.1 |

MG: monoglyceride, DG: diglyceride

The oleic acid contents of the unsaturated fatty acids of liquid oils A to H were about 68%, and those of liquid oils I and J were about 30%.

TABLE 2

| Oils | Details | Glyceride Compn. (%) MG | Glyceride Compn. (%) DG | Glyceride Compn. (%) TG | Acid value (AV) |
|---|---|---|---|---|---|
| soybean oils | commercially available one | N.D. | 1.0 | 99.0 | 0.1 |
| rapessed oils | commercially available one | 0.2 | 2.3 | 97.5 | 0.1 |

MG: monoglyceride, DG: diglyceride, TG: triglyceride
N.D.: not detected

Example 1

A mixture comprising 10% of each oil, 2% of bovine serum albumin, 0.2% of egg yolk lecithin and 87.8% of distilled water was emulsified by use of a high-pressure emulsifier to obtain an emulsion having an average particle diameter of 0.25 mm. This emulsion was orally administered to SD rats aged 13 weeks which had been fasted for 18 hours in a dose of 0.73 ml per 100 g of the weight. Blood specimens were collected from a group composed of four rats after the lapse of predetermined times (i.e., 0, 0.7, 1.0, 1.7 and 3.3 hours) to determine the change in blood triglyceride level. The results are given in Table 3.

TABLE 3

| Hours | Liquid Oil A (mg/ml) | Liquid Oil B (mg/ml) | Liquid Oil C (mg/ml) | Rapeseed oil (mg/ml) | Soybean Oil (mg/ml) |
|---|---|---|---|---|---|
| 0 | 0.69 ± 0.09 | 0.69 ± 0.08 | 0.72 ± 0.09 | 0.60 ± 0.12 | 0.75 ± 0.15 |
| 0.7 | 0.60 ± 0.08* | 0.75 ± 0.09* | 0.89 ± 0.12 | 0.96 ± 0.12 | 1.02 ± 0.15 |
| 1.0 | 0.72 ± 0.06* | 1.02 ± 0.15* | 1.60 ± 0.15 | 1.71 ± 0.24 | 1.76 ± 0.21 |
| 1.7 | 1.23 ± 0.12* | 1.48 ± 0.21* | 2.32 ± 0.30 | 2.55 ± 0.42 | 2.63 ± 0.36 |
| 3.3 | 1.16 ± 0.16* | 1.36 ± 0.30* | 2.19 ± 0.48 | 2.48 ± 0.57 | 2.19 ± 0.48 |

*the blood triglyceride level significantly lower (t < 0.01) than those as observed after the lapse of the corresponding time with respect to the groups of rats to which rapeseed oil or soybean oil was administered.

The groups of rats which had been fed with liquid oils A and B, respectively, were reduced significantly (t<0.01) in blood triglyceride level increase as compared with the groups which had been fed with rapeseed oil and soybean oil, respectively, which supports that liquid oils A and B were effective in inhibiting an inrrease of the blood triglyceride level of a person having eaten. On the other hand, the group of rats which had been fed with liquid oil C was not significantly (t<0.01) reduced in blood triglyceride level increase as compared with the groups which had been fed with rapeseed oil and soybean oil, respectively.

Example 2

Ten SD rats aged six weeks were fed with each food having a composition specified in Table 4 for three weeks to determine changes in weight and body fat content. The results are given in Table 5.

The body fat content were determined by small research animal body composition analyzer (EM-SCAN Model SA-2, a product of EM-SCAN Inc.) using electric conductivity under Nembutal anesthesia.

TABLE 4

| Liquid oil | 10% |
|---|---|
| Casein | 20% |
| Minerals | 3.5% |
| Vitamins | 1.0% |
| DL-Methionine | 0.3% |
| Potato starch | 60.2% |
| Cellulose | 5.0% |
| in total | 100.0% |

TABLE 5

| Period of feeding | Liquid Oil A | Liquid Oil B | Liquid Oil C | Rapeseed oil | Soybean oil |
|---|---|---|---|---|---|
| 0 day (weight: g) | 140.6 ± 4.8 | 139.4 ± 5.7 | 141.0 ± 4.1 | 140.0 ± 5.8 | 139.9 ± 5.5 |
| 14 days (weight: g) | 277.7 ± 8.9 | 280.8 ± 7.5 | 289.0 ± 7.5 | 296.3 ± 5.5 | 299.3 ± 9.0 |
| 21 days (weight: g) | 345.2 ± 11.1 | 348.6 ± 10.3 | 351.2 ± 10.9 | 359.7 ± 12.8 | 361.2 ± 11.5 |
| body fat content (%: 21 days) | 12.8 ± 2.0* | 14.8 ± 2.7** | 17.3 ± 2.6 | 18.0 ± 3.8 | 19.1 ± 4.1 |

*the body fat content lowered significantly (t < 0.01) as compared with those of the groups to which rapeseed oil and soybean oil administered, respectively
**the body fat content lowered significantly (t < 0.05) as compared with those of the groups to which rapeseed oil and soybean oil were administered, respectively The group of rats which had been fed with liquid oil A was lowered significantly (t<0.01) in body fat content as compared with the groups of rats which had been fed with rapeseed oil and soybean oil, respectively, while the group of rats which had been fed with liquid oil B was lowered significantly (t<0.05) therein as compared therewith. It can be understood from these results that liquid oils A and B were little accumulated in the visceral organ or adipose tissue. On the other hand, the group of rats which had been fed with liquid oil C was not significantly lowered in body fat content as compared with the groups of rats which had been fed with rapeseed oil and soybean oil, respectively.

Example 3

Cooking was conducted by use of the prepared oils to evaluated the general-purpose properties of the same.

Oils compositions were newly prepared according to the formulae specified in Table 6.

TABLE 6

| Oils | Compn. |
|---|---|
| liquid oil 1 | liquid oil A + ascorbyl palmitate (200 ppm*) + vitamin E (500 ppm*) |
| liquid oil 2 | liquid oil B |
| liquid oil 3 | liquid oil F |
| liquid oil 4 | liquid oil G + ascorbyl palmitate (200 ppm*) + vitamin E (500 ppm*) |
| liquid oil 5 | liquid oil I + ascorbyl palmitate (200 ppm*) + vitamin E (500 ppm*) |

*based on the oil

The oils compositions were evaluated by making fried noodles therewith. The evaluation was made for the smoking and workability in cooking and the flavor and greasiness of fried noodles by five panelists. The results are given in Table 7.

• Smoking

⊙ no smoking
○ little smoking
Δ somewhat smoking
X smoking

• workability in cooking

⊙ very good
○ good
Δ somewhat bad
X bad

-continued

• flavor

⊙ very good
○ good
Δ somewhat bad
X bad
Ingredients used per head

| liquid oil | 30 g |
|---|---|
| pork | 50 g |
| cabbage | 50 g |
| bamboo shoot | 25 g |
| onion | 25 g |
| shiitake mushroom | 15 g |
| Chinese noodles | 180 g |

TABLE 7

| Oils | Liquid Oil 1 | Liquid Oil 2 | Liquid Oil 3 | Liquid Oil 4 | Liquid Oil 5 |
|---|---|---|---|---|---|
| Smoking | ○ | ◎ | Δ | x | ◎ |
| Workability in cooking cooking | ◎ | ◎ | ○ | ○ | ◎ |
| Flavor | ◎ | ○ | x | x | ◎ |

It can be understood from the above results that liquid oils 1, 2 and 5 do not cause smoking and are so excellent in workability in cooking and flavor as to be usable equivalently to conventional cooking oils. On the contrary, liquid oils 3 and 4 were poor in flavor and cause smoking, thus being unsuitable for stir-frying.

Example 4

Deep-frying was conducted by use of the oils.

Deep-fried foods were made by use of the following materials, and the oils were evaluated for smoking, workability in cooking, and flavor by five panelists (according to the same criteria as those used in Example 3). The results are given in Table 8.

Ingredients Used in Deep-Frying

| oils | 300 g |
|---|---|
| prawn | two |
| pumpkin | two pieces |
| Composition of batter | |
| egg | 50 g |
| water | 150 g |
| wheat flour | 100 g |

TABLE 8

| Oils | Liquid Oil 1 | Liquid Oil 2 | Liquid Oil 3 | Liquid Oil 4 | Liquid Oil 5 |
|---|---|---|---|---|---|
| Smoking | ○ | ◎ | Δ | x | ◎ |
| Workability in cooking cooking | ◎ | ◎ | ○ | ○ | ◎ |
| Flavor | ◎ | ○ | x | x | ◎ |

It can be understood from the above results that liquid oils 1, 2 and 5 do not cause smoking, are excellent in workability in cooking and flavor, and are not greasy, so that they can be used equivalently to conventional cooking oils. On the contrary, liquid oils 3 and 4 were poor in flavor and cause smoking, thus being unsuitable for deep-frying.

Example 5

The oils were evaluated for low-temperature resistance by allowing them to stand in a refrigerator at 5° C. for one week to determine whether crystallization occurred or not. The results are given in Table 9.

Low-Temperature Resistance

◎ not crystallized (transparent)
○ became slightly cloudy with no crystallization observed
Δ crystallized
X wholly solidified

TABLE 9

| | Liquid Oil A | Liquid Oil B | Liquid Oil D | Liquid Oil E |
|---|---|---|---|---|
| Low-temperature resistance | ○ | ○ | x | x |

| | Liquid Oil H | Liquid Oil I | Liquid Oil J |
|---|---|---|---|
| Low-temperature resistance | Δ | =2 | ◎ |

It can be understood from the above results that liquid oils A, B, I and J exhibit a low-temperature resistance (i.e. are inhibited from crystallizing), while liquid oils D, E and H are so poor in low-temperature resistance as to cause crystallization or solidification.

Example 6

An oils composition was prepared by adding a polyglycerol-fatty acid ester having an HLB of 2 to liquid oil B in an amount of 1000 ppm based on the oil; another oils composition was prepared by adding a polyglycerol-fatty acid ester having an HLB of 5 to liquid oil B in an amount of 1000 ppm based thereon; and still another oils composition was prepared by adding a polyglycerol-fatty acid ester having an HLB of 2 to liquid oil 1 in an amount of 1000 ppm based thereon. These oils compositions were evaluated for low-temperature resistance (inhibition of crystallization) in the same manner as that used in Example 5 (according to the same criteria as those used in Example 5). The results are given in Table 10.

TABLE 10

| | Liquid oil B + polyglycerol-fatty acid ester (HLB: 2) | Liquid oil B + polyglycerol-fatty acid ester (HLB: 5) | Liquid oil 1 + polyglycerol-fatty acid ester (HLB: 2) | Liquid oil B | Soybean oils |
|---|---|---|---|---|---|
| Low-temp. resistance | ◎ | ○ | ◎ | ○ | ◎ |

It can be understood from these results that the oils can be improved in low-temperature resistance (inhibition of crystallization) by the addition of a crystallization inhibitor having an HLB of 4 or below.

We claim:

1. A general-purpose liquid oils composition consisting essentially of oils containing glycerides, wherein 1,3-diglycerides are present in an amount of 40 to 90% by weight and monoglycerides in an amount of less than 1.5% by weight, with unsaturated fatty acids accounting for at least 93% by weight of the fatty acid components constituting diglycerides.

2. The composition as claimed in claim 1, wherein the oils contain 45 to 80% by weight of 1,3-diglycerides and the monounsaturated fatty acid content of the unsaturated fatty acids is 60% by weight or below.

3. The composition as claimed in claim 2, wherein the constituent fatty acids of the glycerides are fatty acids prepared by removing saturated fatty acids from fatty acids of soybean oil by wintering.

4. The composition as claimed in any of claims 1 to 3, which has a smoke point of 170° C. or above.

5. The composition as claimed in any of claims 1 to 3, which has an acid value (AV) of 1.0 or below.

6. The composition as claimed in any of claims 1 to 3, which further comprises one or more antioxidants.

7. The composition as claimed in any of claims 1 to 3, which further comprises a crystallization inhibitor having an HLB value of 4 or below.

8. The composition as claimed in claim 6, wherein the antioxidant is selected from the group consisting of natural antioxidants, tocopherols, ascorbyl palmitate and phospholipids and the content thereof is 50 to 2000 ppm based on the oils.

9. The composition as claimed in claim 8, wherein the antioxidant is ascorbyl palmitate and tocopherols, used together.

10. The composition as claimed in claim 7, wherein the crystallization inhibitor is selected from the group consisting of polyglycerol-fatty acid esters, sucrose-fatty acid esters, and sorbitan-fatty acid esters and the content thereof is 200 to 5000 ppm based on the glyceride component.

* * * * *

UNITED STATES PATENT AND TRADEMARK OFFICE
CERTIFICATE OF CORRECTION

PATENT NO. : 6,004,611
DATED : December 21, 1999
INVENTOR(S) : Naohiro Gotoh et al.

It is certified that error appears in the above-identified patent and that said Letters Patent is hereby corrected as shown below:

Column 10,

Table 9, "

TABLE 9

|  | Liquid Oil A | Liquid Oil B | Liquid Oil D | Liquid Oil E |
|---|---|---|---|---|
| Low-temperature resistance | ○ | ○ | x | x |

|  | Liquid Oil H | Liquid Oil I | Liquid Oil J |
|---|---|---|---|
| Low-temperature resistance | Δ | —2 | ⊚ |

"

should read --

TABLE 9

|  | Liquid Oil A | Liquid Oil B | Liquid Oil D | Liquid Oil E |
|---|---|---|---|---|
| Low-temperature resistance | ○ | ○ | x | x |

|  | Liquid Oil H | Liquid Oil I | Liquid Oil J |
|---|---|---|---|
| Low-temperature resistance | Δ | ⊚ | ⊚ |

--

Signed and Sealed this

Thirty-first Day of August, 2004

JON W. DUDAS
*Director of the United States Patent and Trademark Office*